(12) United States Patent
Nordh

(10) Patent No.: US 8,747,105 B2
(45) Date of Patent: Jun. 10, 2014

(54) INSERT TUBE AND A SYSTEM OF INSERT TUBES

(75) Inventor: Lennart Nordh, Gothenburg (SE)

(73) Assignee: Valmet Power AB, Gotenburg (SE)

( * ) Notice: Subject to any disclaimer, the term of this patent is extended or adjusted under 35 U.S.C. 154(b) by 540 days.

(21) Appl. No.: 12/696,860

(22) Filed: Jan. 29, 2010

(65) Prior Publication Data
US 2010/0132823 A1    Jun. 3, 2010

Related U.S. Application Data

(62) Division of application No. 11/911,546, filed as application No. PCT/SE2006/050089 on May 3, 2006, now abandoned.

(30) Foreign Application Priority Data

May 10, 2005    (SE) ...................................... 0501053

(51) Int. Cl.
| | |
|---|---|
| F23D 11/44 | (2006.01) |
| F28F 7/00 | (2006.01) |
| F28F 9/04 | (2006.01) |
| F16L 5/00 | (2006.01) |
| B23P 6/00 | (2006.01) |
| F16L 55/18 | (2006.01) |
| F28F 9/16 | (2006.01) |

(52) U.S. Cl.
CPC ...................................... F28F 9/167 (2013.01)
USPC ............... 431/215; 165/76; 165/79; 165/178; 285/221; 285/222; 29/890.031; 29/402.09; 138/97

(58) Field of Classification Search
USPC ............ 431/215; 285/221, 222; 165/178, 76, 165/79; 29/402.05, 890.031; 138/97
See application file for complete search history.

(56) References Cited

U.S. PATENT DOCUMENTS

| | | | | |
|---|---|---|---|---|
| 1,714,703 A | * | 5/1929 | Walton | 285/211 |
| 2,225,615 A | * | 12/1940 | Bay | 285/55 |
| 2,484,904 A | * | 10/1949 | Pennella | 285/213 |
| 2,620,830 A | * | 12/1952 | Schultz | 138/97 |
| 3,305,012 A | * | 2/1967 | Allen | 165/178 |
| 3,592,261 A | * | 7/1971 | Black | 165/178 |

(Continued)

FOREIGN PATENT DOCUMENTS

| | | | | |
|---|---|---|---|---|
| EP | 516179 A2 | * 12/1992 | ............. | B21D 39/04 |
| GB | 2269447 A | * 2/1994 | ............. | F28F 19/00 |
| JP | 63161395 A | * 7/1988 | ............. | F28F 11/02 |

Primary Examiner — Steven B McAllister
Assistant Examiner — Frances H Kamps
(74) Attorney, Agent, or Firm — Rolf Fasth; Fasth Law Offices

(57) ABSTRACT

An insert tube is used for the repair or improvement of a pre-heating tube for air arranged in an exhaust gas pathway of a fuel burner. A pre-determined radial gap exists between the outer surface of the insert tube and the inner surface of the pre-heating tube for air such that the insert tube can be slid into the pre-heating tube for air. The insert tube is provided in the vicinity of each end with at least one groove that runs around its circumference. In the groove there is arranged at least one sealing ring of an elastic material. The sealing ring mounted in the groove has an external diameter that exceeds the internal diameter of the preheating tube for air. The sealing ring forms a seal against the inner surface of the pre-heating tube for air and prevents leakage through the sealing ring.

6 Claims, 1 Drawing Sheet

(56) References Cited

U.S. PATENT DOCUMENTS

| | | | |
|---|---|---|---|
| 3,781,966 A * | 1/1974 | Lieberman | 29/890.031 |
| 4,028,789 A * | 6/1977 | Loch | 29/890.031 |
| 4,819,315 A * | 4/1989 | Cartry et al. | 29/890.031 |
| 5,079,837 A * | 1/1992 | Vanselow | 29/890.031 |
| 5,304,219 A * | 4/1994 | Chernoff et al. | 607/122 |
| 5,324,084 A * | 6/1994 | Bodas et al. | 285/222 |
| 5,349,738 A * | 9/1994 | Crane et al. | 29/434 |
| 5,489,277 A * | 2/1996 | Tolkoff et al. | 604/529 |
| 5,647,681 A * | 7/1997 | Chen | 403/270 |
| 6,290,791 B1 * | 9/2001 | Shaw et al. | 156/64 |
| 6,325,424 B1 * | 12/2001 | Metcalfe et al. | 285/305 |
| 6,854,770 B2 * | 2/2005 | Leblanc | 285/230 |
| 6,964,297 B1 * | 11/2005 | Janezich et al. | 165/178 |
| 7,252,138 B2 * | 8/2007 | Burkhalter et al. | 165/76 |
| 7,604,263 B2 * | 10/2009 | Mori et al. | 285/376 |
| 7,895,726 B2 * | 3/2011 | Maguire | 29/505 |

\* cited by examiner

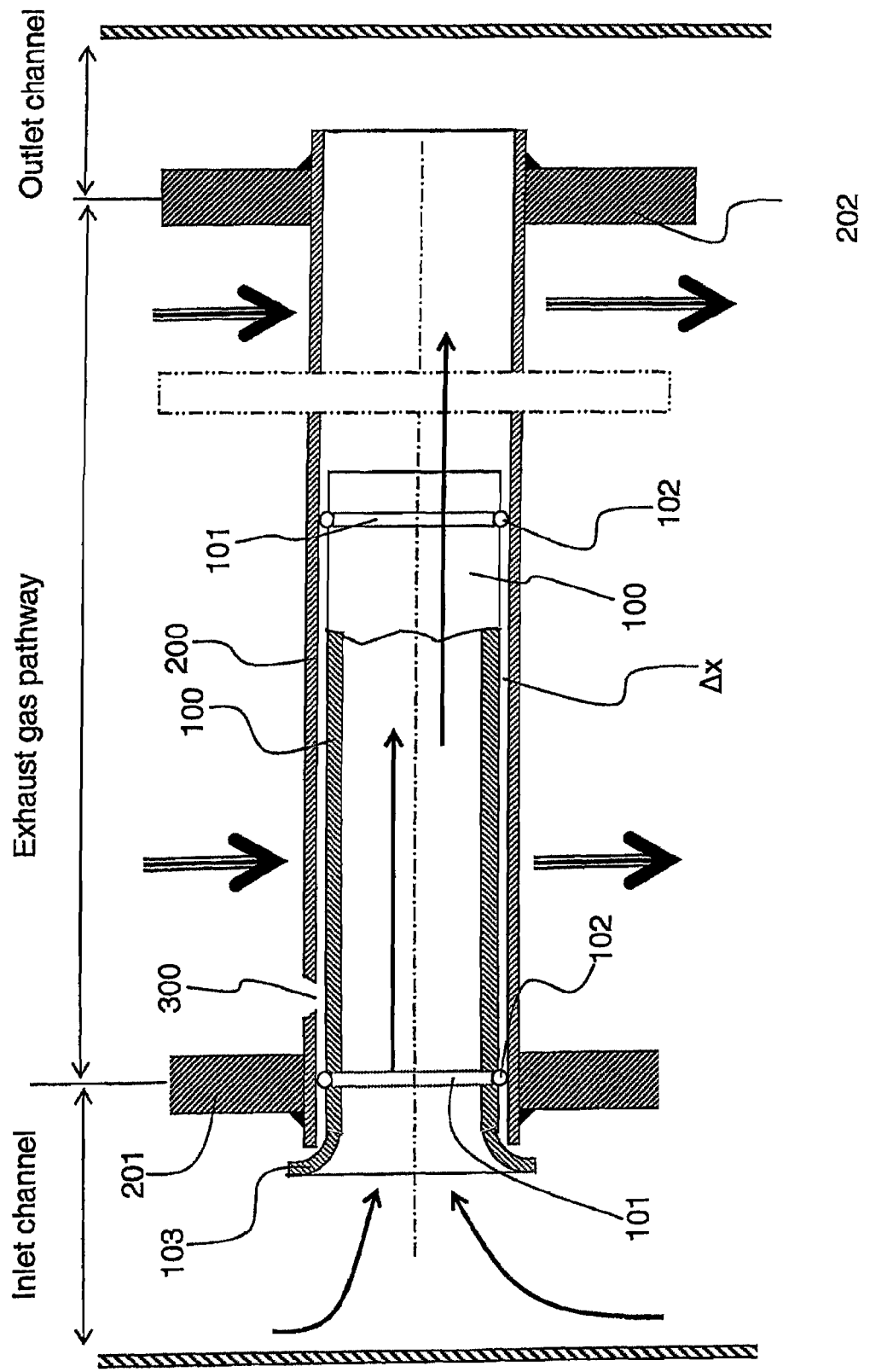

INSERT TUBE AND A SYSTEM OF INSERT TUBES

PRIOR APPLICATION

This application is a divisional patent application based on U.S. national phase application Ser. No. 11/911,546, filed 15 Oct. 2007 that is based on International Application No. PCT/SE2006/050089, filed 3 May 2006, claiming priority from Swedish Patent Application No. 0501053-3, filed 10 May 2005.

TECHNICAL AREA

The present invention relates to an insert tube and a system.

BACKGROUND AND SUMMARY OF THE INVENTION

It is known in certain fuel burners that pre-heating tubes for air are arranged at the exhaust gas pathway of the fuel burner. The purpose of these pre-heating tubes for air is to heat the cold combustion air with the aid of the hot exhaust gases that pass through the exhaust gas pathway. At the same time as the air is heated, the passing exhaust gases reach a lower outlet temperature and this improves the efficiency of the burner. It is advantageous from this viewpoint that the input air has a low temperature.

The most exposed site in a pre-heater unit for air is the cold inlet section of the pre-heating tube for air. It is here that the air is coldest, which means that certain substances in the exhaust gas can condense onto these cold sections of the pre-heating tube for air leading to corrosion. This in turn leads to perforation of the pre-heating tube for air.

The exhaust gas will be cooler close to the walls of the exhaust gas pathway than further in. This further increases the risk of corrosion at the inlet of the pre-heating tube for air, and at its outlet. It may thus become necessary to repair or prevent damage also to the outlet of the pre-heating tube for air.

When damage has arisen as a result of such corrosion, the insertion of what are known as insert tubes is known, where the gap between the insert tube and the pre-heating tube for air has been filled with a heat-resistant glue or filler. The aim in this case is thus to seal the leak, although an additional aim has been to create an insulating layer such that the pre-heating tube for air maintains a higher temperature and in this way decrease the risk of corrosion. Not only is the insert tube difficult to install; it is also difficult to remove if it is to be exchanged for a longer insert tube. This may be the case if the lowest material temperature now arises close to the outlet of the insert tube. The disadvantages of this method of inserting insert tubes are that the mounting involves handling a messy substance, and that it is difficult to dismount should an exchange to another insert tube become necessary.

A second method is that of fixing the insert tube by rolling. The rolling-in thus takes place both at the inlet and at the end of the insert tube. Variants of this method are revealed by U.S. Pat. No. 4,069,573 and U.S. Pat. No. 4,941,512. The disadvantages of rolling are that special tools are required and that it is difficult to exchange an existing insert tube for a longer tube.

A variant is revealed in U.S. Pat. No. 4,581,801 in which the outer ends of the insert tube can be expanded with the aid of an expander tool such that the ends are locked attached to the pre-heating tube for air. However, the very design of this variant is very complex, and a special tool is required to insert and remove the insert tube.

A first aim of the invention is to achieve an insert tube that fully or partially solves the problems and disadvantages of the prior art described above.

A second aim with the insert tube is to prevent the leakage of air through the holes that have arisen through corrosion in the pre-heating tube for air.

A third aim is to prevent with the aid of an insert tube holes arising in the pre-heating tube for air as a consequence of corrosion.

A fourth aim is that the insert tube is to have a design, and it is to be arranged in the pre-heating tube for air in such a manner, such that it is easy to exchange the pre-heating tube for air for a tube with a different length.

A fifth aim is to obtain an insulating air gap between the insert tube and the pre-heating tube for air that protects against corrosion.

A sixth aim is to obviate the necessity of using complicated and expensive attachment arrangements of the type of the expander tool that is shown in U.S. Pat. No. 4,581,801.

The proposed insert tube has at least two sealing rings. One sealing ring is located at the inlet and one is located at the outlet of the insert tube. The gap between the insert tube and the pre-heating tube for air will be an insulating layer that gives a higher temperature to the pre-heating tube for air, something that means that the rate of corrosion can be reduced. The insert tube can either be inserted once a hole has arisen in the pre-heating tube for air, or it can be inserted as a preventative measure. It is simple to mount and remove the insert tube. The reduced diameter that the insert tube gives rise to in a restricted region causes a higher air velocity and thus a greater reduction in pressure. One way of reducing this effect is to provide the insert tube with an end with the shape of a funnel. The fall in pressure may even be lower than it was previously. The funnel also prevents the insert tube from sliding further in. If the corrosion continues further in into the pre-heating tube for air and makes its presence felt in the form of holes close to the end of the insert tube, the insert tube can be simply exchanged for a longer one.

An insert tube and a system of insert tubes for the repair of pre-heating tubes for air are obtained through the invention, where the insert tubes can be mounted more simply and rapidly, and which also allow the exchange of insert tubes for tubes of a different length, in a simple manner with a minimum of time required.

BRIEF DESCRIPTION OF THE DRAWINGS

FIG. 1 shows an insert tube according to the invention arranged in a pre-heating tube for air, which pre-heating tube for air is arranged across an exhaust gas pathway for a fuel burner.

DETAILED DESCRIPTION OF THE INVENTION

FIG. 1 shows a pre-heating tube for air 200, which is part of a pre-heater unit for air arranged in an exhaust gas pathway for a fuel burner (not shown in the drawing). The exhaust gas pathway connects to a neighbouring inlet channel through an air inlet wall 201. The exhaust gas pathway makes contact also with a neighbouring outlet channel through an air outlet wall 202.

Air at a first lower temperature is led in the pre-heating tube for air 200 from an inlet channel on one side of the exhaust gas pathway, which air has been heated during its passage through the pre-heating tube for air in that hot exhaust gases flow externally to the pre-heating tube for air, where the air has a second higher temperature after its passage through the pre-heating tube for air and where the air is led to an outlet channel on the other side of the exhaust gas pathway and onwards to other heat-exchange surfaces of the pre-heating unit for air in order subsequently to be used as combustion air in the combustion chamber of the burner (not shown in the drawing). This first lower temperature corresponds to an ambient temperature of up to 100° C.; this temperature preferably lies in the interval 40-80° C.

FIG. 1 shows also an insert tube 100 according to the invention, which insert tube 100 is arranged inside the pre-heating tube for air 200. The principal aim of the insert tube 100 is to repair a pre-heating tube for air that has been attacked by corrosion as a result of the formation of condensation in the pre-heating unit for air due to the cooling of the hot exhaust gases. The corrosion most often appears close to the inlet of the pre-heating tube for air 200 where the air is coldest. FIG. 1 shows an example of common damage 300 in the form of a hole in the pre-heating tube for air 200. The secondary purpose of the insert tube is to improve the pre-heating tube for air by the creation of an insulating air gap between the insert tube 100 and the pre-heating tube for air 200.

The insert tube 100 has a pre-determined radial gap ($\Delta x$) between the outer surface of the insert tube and the inner surface of the pre-heating tube for air, such that the insert tube can be slid inwards into the pre-heating tube for air either from the inlet channel or from the outlet channel (only the embodiment in which the insert tube has been inserted from the inlet channel is shown in the drawing). The magnitude of the radial gap ($\Delta x$) between the outer surface of the insert tube and the inner surface of the pre-heating tube for air lies in the interval 0.1-3.0 mm, and preferably in the interval 0.5-2.0 mm. The insert tube 100 is provided in the vicinity of each end with at least one groove 101 that runs around its circumference, in which groove 101 there is arranged at least one sealing ring 102 of an elastic material. The sealing ring 102 mounted in the groove 101 has an external diameter that exceeds the inner diameter of the pre-heating tube for air 200, whereby the sealing ring 102 forms a seal with the inner surface of the pre-heating tube for air and prevents leakage through the sealing ring 102.

The proposed insert tube has two sealing rings 102 in the normal case. It is appropriate in the embodiment in which the insert tube 100 has been inserted from the inlet channel that one sealing ring 102 is located at the air inlet wall 201 for the exhaust gas pathway and one at the end of the insert tube 100. It is appropriate in the embodiment in which the insert tube 100 has been inserted from the outlet channel that one sealing ring 102 is located at the air outlet wall 202 for the exhaust gas pathway and one at the end of the insert tube 100. The gap between the insert tube and the pre-heating tube for air forms an insulating layer of air that gives a higher temperature to the pre-heating tube for air. The rate of corrosion can then be reduced. The insert tube may be inserted either when a hole 300 has arisen in the pre-heating tube for air 200, or it can be inserted as a preventative measure. It is appropriate that the distance between the sealing rings 102 at the two ends is greater than 20 cm.

It has been mentioned above that the sealing ring 102 is of an elastic material. The term "elastic material" is used in the following patent application to denote also sprung material and viscoelastic material. The sealing ring 102 may be constituted by a either an O-ring, a V-ring, a piston ring, or an X-ring. It is appropriate that the groove 101 be cut in a lathe or rolled.

The reduction in diameter that the insert tube 100 gives rise to in the pre-heating tube for air 200 causes a higher air velocity in a local region, and thus a greater fall in pressure. One method of reducing this effect is to provide the inlet of the insert tube with a collar 103. The term "inlet of the insert tube 100" is here used to denote that end of the insert tube 100 that faces out into the channel (which may be the inlet channel or the outlet channel) from which the insert tube 100 has been inserted.

It is preferable that the collar 103 have the form of a funnel. The inlet will in this case be so beneficial that it may be so that the fall in pressure is less than was previously the case. The collar 103 also prevents the insert tube 100 from sliding further into the pre-heating tube for air 200 in that the collar 103 has a cross-section that is greater than the inner diameter of the pre-heating tube for air. When the insert tube 100 has been fully inserted into the pre-heating tube for air 200, the collar 103 allows the application of tools behind the collar 103 for the withdrawal of the insert tube 100.

It is advantageous that the insert tube 100 be manufactured from a metallic material, and it is advantageous in this case from the point of view of costs that the material is carbon steel. Other suitable materials for the insert tube are heat-resistant plastics and ceramics.

There may be systems of approximately 10,000 pre-heating tubes for air (200) arranged across an exhaust gas pathway at large fuel burners, at least half of which may require repair or protection by insert tubes (100). It is appropriate that the best way of achieving this is to have several different lengths of insert tube (100) that are available for adaptation of the insert tube (100) such that it covers the region of the pre-heating tube for air (200) that it is intended should be protected or that is leaking, or both. It is appropriate that the shortest insert tube (100) has a length of between 10 and 30 centimeters, where the subsequent length or lengths are multiples of two of this length, whereby the longest insert tube (100) is sufficient for the complete pre-heating tube for air (200) from the inlet channel to the outlet channel.

The advantage over the prior art is achieved with the invention that the insert tube or tubes (100) is or are easier to mount and easier to exchange for insert tubes (100) with different lengths.

The invention is not limited to the embodiments shown: several variants are possible within the framework of the attached patent claims.

While the present invention has been described in accordance with preferred compositions and embodiments, it is to be understood that certain substitutions and alterations may be made thereto without departing from the spirit and scope of the following claims.

The invention claimed is:

1. A method of repairing a pre-heating tube arranged in an exhaust gas pathway of a fuel burner, comprising:
   providing an insert tube, having a first elastic sealing ring and a second elastic sealing ring disposed on an outside periphery surface of the insert tube, the insert tube having grooves defined therein on the outside periphery surface at each end on the outside periphery surface of the insert tube, the insert tube having an inlet and an outlet defined therein;
   providing a heated pre-heating tube having an inlet and an outlet;
   passing air, having a first temperature, from the inlet through the heated pre-heating tube and out through the outlet;
   leading air at the first temperature from the inlet channel at one side of the exhaust gas pathway and heating the air passing through the pre-heating tube by hot exhaust gases flowing externally to the pre-heating tube;

the pre-heating tube heating the air for the fuel burner to a second temperature being higher than the first temperature;

the preheating tube eroding, sliding the insert tube, having the first and second elastic sealing rings disposed in the grooves thereof, into the eroded pre-heating tube while compressing the first and second elastic sealing rings during insertion of the insert tube into the eroded pre-heating tube;

the inserted and compressed first and second elastic sealing rings of the insert tube sealing air disposed in an insulation layer formed between the insert tube and the eroded pre-heating tube;

the sealed air in the insulation layer raising the first temperature of the air at the inlet to a raised temperature, the insertion of the insert tube repairing the eroded pre-heating tube; and passing air, having the raised temperature, through the inlet of the insert tube disposed inside the eroded pre-heating tube and out through the outlet of the insert tube.

2. The method of claim 1 further comprising the steps of providing the insert tube with a funnel-shaped collar at one end thereof and the collar reducing a fall in pressure of the air passing through the inlet into the pre-heating tube.

3. The method of claim 1 further comprising providing the insert tube with a funnel-shaped collar and inserting the insert tube until the funnel-shaped collar abuts an end of the pre-heating tube.

4. The method of claim 3 further comprising the step of leading the heated air after the passage of the air through the pre-heating tube to an outlet channel on another side of the exhaust gas pathway to a combustion chamber of a burner and using the air as combustion air.

5. The method of claim 4 further comprising the steps of the first and second sealing rings forming a seal against an inner surface of the pre-heating tube and preventing leakage through the sealing ring so that a gap between the insert tube and the pre-heating tube forms the insulating layer.

6. The method of claim 1 further comprising the steps of sliding the insert tube into the preheating tube either from an inlet channel or from an outlet channel.

\* \* \* \* \*